(No Model.)
C. B. DARLEY.
CORN CUTTING DEVICE.
No. 422,384. Patented Mar. 4, 1890.
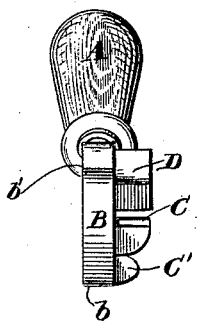
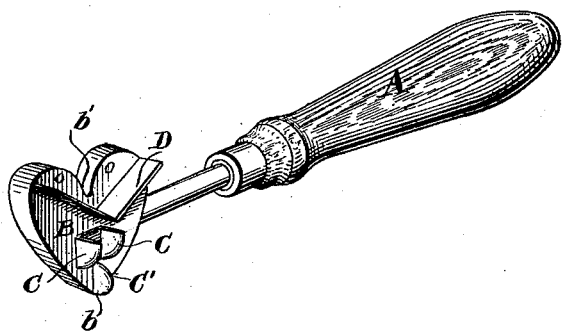
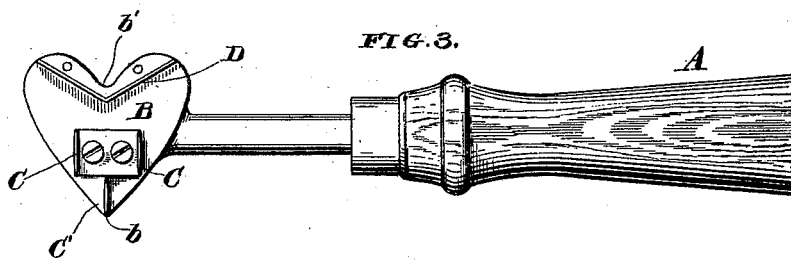
WITNESSES:
David S. Williams
Henry Drury
INVENTOR:
Cecelia B. Darley
by her attorney
Francis T. Chambers

UNITED STATES PATENT OFFICE.

CECELIA B. DARLEY, OF PHILADELPHIA, PENNSYLVANIA.

CORN-CUTTING DEVICE.

SPECIFICATION forming part of Letters Patent No. 422,384, dated March 4, 1890.

Application filed May 13, 1889. Serial No. 310,579. (No model.)

*To all whom it may concern:*

Be it known that I, CECELIA B. DARLEY, of the city and county of Philadelphia, State of Pennsylvania, have invented a new and useful Improved Corn-Cutting Device, of which the following is a true and exact description, reference being had to the accompanying drawings, which form a part of this specification.

The object of my invention is to provide an improved device by which the grains of green corn can be slit and removed from the cob and from the husk or skin by which they are surrounded. My device will be best understood after a description of the drawings, in which it is illustrated, and the novel features thereof are hereinafter clearly pointed out in the claim, reference being now had to the drawings, which illustrate my device in the form which I consider the best for practical use, and in which—

Figure 1 is a perspective view of my device; Fig. 2, an end view of the same in about the angular position it occupies in Fig. 1, and Fig. 3 a front view thereof.

A is a handle; B, a base-plate, on the front end of which are secured a number of knife-blades C C C'. Preferably I provide the device with a central blade C', to act as a guiding-blade—that is, to pass between two rows of corn, while the blades C C, arranged on each side thereof, will pass approximately through the middle of the rows of corn. When this construction is used, it is advisable that the guiding-blade C' should be somewhat shorter than the slitting-blades C C. D is a scraper situated behind the slitting-knives, and preferably made deeper than the knives themselves, as shown in the drawings. It is given the wedge-shaped form shown, so as to push out at the sides the split grains of corn scraped from the cobs, it acting somewhat like a plowshare.

I prefer to make the plate B, which supports the knife-blades and scraper, of the heart shape shown, so that the two angles $b$ and $b'$ shall be in line with the knife-blades and in the center of them, so as to afford a guide to the eye in using the corn-cutting device.

The mode in which my improved device is to be used is obvious from a glance at the drawings. The operator takes hold of the handle and scrapes down along the rows of corn-grains, the knives slitting open the skin and the scraper pressing out the grains, and the operation being very rapidly and completely performed.

Having now described my invention, what I claim as new, and desire to secure by Letters Patent, is—

A corn-cutting device consisting of two or more knives for slitting the grains of corn, in combination with a wedge-shaped scraper situated in the rear of the knives, with its point toward them, and a handle, all substantially as and for the purpose specified.

CECELIA B. DARLEY.

Witnesses:
FRANCIS T. S. DARLEY,
GEORGE HOUSE.